(12) United States Patent
Soliman et al.

(10) Patent No.: US 12,077,718 B2
(45) Date of Patent: Sep. 3, 2024

(54) GAS OIL SEPARATION PLANT SYSTEMS AND METHODS WITH REDUCED HEATING DEMAND

(71) Applicant: SAUDI ARABIAN OIL COMPANY, Dhahran (SA)

(72) Inventors: Mohamed Soliman, Juaymah (SA); Samusideen Adewale Salu, Juaymah (SA); Talal Al-Zahrani, Juaymah (SA); Nisar Ahmad Ansari, Tanajib (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/347,178

(22) Filed: Jul. 5, 2023

(65) Prior Publication Data

US 2023/0348793 A1    Nov. 2, 2023

Related U.S. Application Data

(62) Division of application No. 17/329,993, filed on May 25, 2021, now Pat. No. 11,732,198.

(51) Int. Cl.
*B01D 19/00* (2006.01)
*B01D 17/02* (2006.01)
(Continued)

(52) U.S. Cl.
CPC ........... *C10G 7/02* (2013.01); *B01D 17/0214* (2013.01); *B01D 17/06* (2013.01); *B01D 19/0005* (2013.01); *B01D 19/0068* (2013.01); *C10G 7/04* (2013.01); *C10G 31/06* (2013.01); *C10G 2300/1033* (2013.01); *C10G 2300/208* (2013.01); *C10G 2300/4012* (2013.01)

(58) Field of Classification Search
CPC .... C10G 7/02; C10G 7/04; C10G 2300/1033; C10G 2300/208; C10G 2300/4012; B01D 17/0214; B01D 17/06; B01D 19/0005; B01D 19/0068
USPC ......................................................... 208/366
See application file for complete search history.

(56) References Cited

U.S. PATENT DOCUMENTS 4,116,821 A * 9/1978 Peiser .................... F25J 3/0635
                                                              208/361
5,030,339 A    7/1991 Czarnecki
(Continued)

OTHER PUBLICATIONS

ABB Gas Oil Separation Plant, 162 pages, 2013.
(Continued)

*Primary Examiner* — T. Bennett Mckenzie
(74) *Attorney, Agent, or Firm* — Bracewell LLP; Constance G. Rhebergen; Eleanor T. Porter

(57) ABSTRACT

Systems and methods for crude oil separations including degassing, dewatering, desalting, and stabilization. One method includes separating crude oil into a crude oil off-gas and a partially degassed crude oil output; compressing the crude oil off-gas; applying the compressed crude oil off-gas for indirect heating through reboilers of the partially degassed crude oil output; and directly mixing with the crude oil a compressed atmospheric pressure gas. In some embodiments, multiple reboilers are used. In some embodiments, heat exchangers are used. Aftercoolers are used after the compressor to cool the gas; knockout drums are used after the coolers to separate liquids.

18 Claims, 4 Drawing Sheets

(51) Int. Cl.
*B01D 17/06* (2006.01)
*C10G 7/02* (2006.01)
*C10G 7/04* (2006.01)
*C10G 31/06* (2006.01)

(56) References Cited

U.S. PATENT DOCUMENTS

| | | | |
|---|---|---|---|
| 6,045,659 | A | 4/2000 | Bjoerkhaug et al. |
| 7,568,363 | B2 | 8/2009 | Runbalk |
| 8,790,509 | B2 | 7/2014 | Vu |
| 10,023,811 | B2 | 7/2018 | Soliman |
| 10,260,010 | B2 | 4/2019 | Soliman |
| 10,513,663 | B2 | 12/2019 | Soliman et al. |
| 11,292,955 | B2 | 4/2022 | Contreras |
| 2014/0001097 | A1 | 1/2014 | Jothy et al. |
| 2014/0026085 | A1 | 1/2014 | Amminudin et al. |
| 2018/0066194 | A1* | 3/2018 | Soliman ................. C10G 31/06 |
| 2018/0195010 | A1* | 7/2018 | Salu ....................... C10G 31/08 |
| 2018/0291282 | A1 | 10/2018 | Soliman et al. |
| 2021/0002558 | A1 | 1/2021 | Soliman et al. |
| 2022/0064547 | A1 | 3/2022 | Soliman |

OTHER PUBLICATIONS

Al-Abbasi et al., "Khurais Central Processing Facility Journey Toward Excellence in Energy Efficiency", Abu Dhabi International Petroleum Exhibition & Conference, 2016, 6 pages.

Al-Zahrani et al.,"Energy Integration Opportunities in GOSPs Through Gas Conditioning", Abu Dhabi International Petroleum Exhibition and Conference, 2015, 5 pages.

Ansari et al., "Maximum Recovery of Gas Compression Waste Energy", International Petroleum Technology Conference, 2014, 6 pages.

Gas Oil Separation Plant Engineering Encyclopedia (Saudi Aramco), 93 pages, 2013.

Gas Oil Separation Plant Standard SAES-A-010, 32 pages.

Soliman et al., "Innovative Integrated and Compact Gas Oil Separation Plant for Upstream Surface Facilities", Offshore Technology Conference, 2020, 5 pages.

* cited by examiner

GAS OIL SEPARATION PLANT SYSTEMS AND METHODS WITH REDUCED HEATING DEMAND

PRIORITY

The present application is a divisional application of U.S. patent application Ser. No. 17/329,993, filed on May 25, 2021, the entire disclosure of which is incorporated here by reference.

FIELD

The present disclosure relates to gas oil separation plant (GOSP) technology. In particular, the disclosure relates to integrated process control for crude oil desalting, dehydration, sweetening, and stabilization with indirect recycle heating to create efficient GOSP systems and processes to aid in crude oil separations.

DESCRIPTION OF RELATED ART

In general, a GOSP is a continuous separation process used to refine crude oil that often includes a high pressure production trap (HPPT), a low pressure production trap (LPPT), a low pressure degassing tank (LPDT), a dehydrator unit, first and second stage desalting units, a water/oil separation plant (WOSEP), a stabilizer column, centrifugal pumps, heat exchangers, and reboilers. In a GOSP, the pressure is often reduced in several stages to allow the controlled separation of volatile components, such as entrained vapors. Goals of a GOSP include achieving maximum liquid recovery with stabilized oil separated from gas, and water separated from gases and oil. In other words, one purpose of a GOSP is to remove water, salt, and volatile hydrocarbon gases from wet crude oil after it is obtained from a hydrocarbon-bearing reservoir.

However, a large pressure reduction in a single separator will cause flash vaporization, leading to instability and safety hazards. Thus, in prior art GOSP's, many stages and units are required, as described in U.S. Pat. Nos. 10,260,010 and 10,023,811, incorporated herein by reference in their entirety. In a first stage, gas, crude oil, and free water are separated. In a second stage, crude oil is dehydrated and desalted to separate emulsified water and salt to meet certain basic sediment and water (BS&W) specifications. In a third stage, crude oil is stabilized and sweetened to meet hydrogen sulfide ($H_2S$) and Reid Vapor Pressure (RVP) specifications.

Currently, there is a lack of effective and inexpensive technologies for reducing the reboiler and heater loads used in GOSP plants. Due to long pipeline length, oil can arrive to the GOSP's with low temperatures, which can dramatically reduce separation efficiency. Heating the crude uses copious amounts of energy as well as expensive and large pieces of equipment. At the same time, heat from discharge gases is wasted. Therefore, a need exists for a more efficient GOSP plant utilizing waste heat and reducing heating loads.

SUMMARY

The present disclosure describes integrated GOSP systems and processes with compressed gas recycle for indirect heating to meet crude oil export specifications and use of less equipment than prior art GOSP's. Disclosed embodiments provide for the use of discharge gas from off-gas compressors to heat reboilers to indirectly heat crude in a crude stabilizer column. Additionally, disclosed embodiments provide for the direct heating of crude oil by injecting compressed off-gas into crude lines before separation vessels. In some embodiments, high pressure production traps (HPPT's) are not utilized. In some disclosed embodiments, heat exchangers are used to indirectly heat crude with compressed off-gas before the crude is introduced to separation vessels. In some disclosed embodiments, a crude stabilizer column is not required or utilized.

Treatment of the crude in the disclosed GOSP's results in the crude oil meeting the export dry crude specification of 10 lbs. of salt per 1000 barrel of dry crude (PTB) at minimum cost. Systems and methods of the present disclosure can achieve crude oil export specifications including: (1) a salt concentration of not more than about 10 PTB; (2) BS&W content of not more than about 0.3 V %; (3) $H_2S$ content of less than about 60 ppmw in either the crude stabilization tower (or degassing vessels in the case of sweet crude not requiring a stabilization tower), for example between about 20-60 ppmw $H_2S$; and (4) a maximum RVP of about 7 psia and a maximum TVP of about 13.5 psia at 130° F.

Embodiments of systems and methods of the disclosure provide the ability to separate and stabilize crude oils with "tight" emulsions and increased water cuts that existing GOSP systems and methods cannot separate and stabilize. In other words, conventional desalters can treat crude oils with a water cut between about 30% and about 35% by volume. However, embodiments of the present disclosure efficiently treat crude oils to remove water when the water cut is greater than about 35%. Tight emulsion crude oil normally occurs in medium to heavy crude oils with American Petroleum Institute ("API") numbers less than about 29. Oil specific gravity in the API scale is typically used as a measure of oil quality. A higher API value indicates a lighter oil and, thus, a higher market value.

Water cut in oil production refers to the total volume of water in the crude oil stream divided by the total volume of crude oil and water. In other words, water cut percent is equal to the total volumetric flowrate of water divided by the volumetric flowrate of water and oil multiplied by 100. Water cut generally increases with the age of an oil well. For example, water cut at the beginning of the life of a well is around zero percent, but as the well ages, water cut can reach close to 100%.

In certain embodiments, systems and methods are provided to treat wet and sour, unstabilized crude oil to meet shipping and transport specifications by simultaneously dehydrating, desalting, stabilizing, and sweetening the crude oil. In some embodiments, three conventional stages of processing crude oil will be done in only one stage, system, or process. In some embodiments, crude oil desalting, dehydration, sweetening, and stabilization will be integrated within existing three phase separation vessels within a GOSP along with gas compression and gas recycle for indirect heating. Dehydrating crude oil involves the separation of formation water, while desalting includes washing the crude with fresh water in addition to or alternative to recycle water to meet the required salt content and BS&W content.

Crude sweetening involves the removal of dissolved $H_2S$ from crude oil to meet specifications in a range of about 20-70 ppmw, while crude stabilization involves the removal of light ends from crude oil, mainly $C_1$-$C_4$ hydrocarbons to reduce the TVP to less than about 13 psia at 130° F. below atmospheric pressure, or in other words no vapor will flash under atmospheric conditions, making it safe for transportation and shipment. Stabilizing the crude can be achieved if crude is heated in multiple stages of separation drums working at increasing temperatures and reduced pressure.

In some embodiments, crude oil components can be separated in a series of separation vessels in which off-gases are removed from the separation vessels and compressed to heat incoming crude oil to enhance the separation, in particular focusing on systems and processes with 3-phase separation vessels including fully insulated electrostatic electrodes. In some embodiments the advantages of the systems and processes include eliminating certain existing separation vessels, including the HPPT, eliminating crude oil stabilizer reboilers, utilizing waste heat and gas streams to heat incoming crude improving separation of oil from gas and water, minimizing reboiler operating temperatures needed to meet crude specifications, eliminating or minimizing outside heating requirements, and eliminating separate crude oil dehydrators.

In embodiments of the present disclosure, the unique arrangement of reboilers and heat exchangers utilizing discharge gas from compressors to heat crude, as well as direct injection of gases into crude lines before separation in vessels, allows for advantageous treatment of inlet crude oil by heating the crude oil, which aids in separating tight emulsions, de-watering, de-gassing, desalting, and stabilizing crude oil, including crude from the crude stabilizer column. In these embodiments, the unique arrangement of reboilers using compressor discharge gases as heating media for crude oil, recycled to the crude stabilizer, results in improved impurities recovery in the crude stabilizer column, a minimization of the reboiler operating temperature, and a reduction of outside heating sources brought to raise the temperature of the crude within the crude stabilizer column. In some embodiments, advantageously, the atmospheric compressor aftercooler and knock-out drum are not required, hydrocarbon condensate pumps are not required, and a low pressure compressor discharge knock-out drum and aftercooler are not required. In some embodiments, a number of required heat exchangers is reduced or eliminated. In these embodiments, the recycled gas increases product yield, and simultaneously heats crude and improves separation.

Therefore, disclosed herein are integrated gas oil separation plant systems with integrated process control, one system including a crude oil inlet feed stream comprising crude oil, a low pressure production trap (LPPT) fluidly coupled to the crude oil inlet feed stream operable to separate gas from the crude oil in the crude oil inlet feed stream, a low pressure degassing tank (LPDT) fluidly coupled to the LPPT, a desalting vessel fluidly coupled to the LPDT operable to remove dissolved solids and separate water from the crude oil, and a crude stabilizer column fluidly coupled to the desalting vessel operable to remove gas and impurities from the crude oil. The system also includes an atmospheric pressure off-gas compressor fluidly coupled to the LPDT operable to compress off-gas from the LPDT for production of compressed atmospheric gas for direct injection into the crude oil preceding introduction to the LPPT, a low pressure off-gas compressor fluidly coupled to the LPPT operable to compress off-gas from the LPPT for production of compressed low pressure gas for use in the GOSP, a high pressure off-gas compressor fluidly coupled to the LPPT for production of compressed high pressure gas for use in indirect heating in a first reboiler of the crude stabilizer column, and a first reboiler fluidly coupled to the high pressure off-gas compressor and operable to transfer heat from the compressed high pressure gas to crude oil removed from and recycled to the crude stabilizer column.

In some embodiments, the system further includes a high pressure production trap (HPPT) operable to separate gas from the crude oil in the crude oil inlet feed stream, where the HPPT is fluidly coupled to the high pressure off-gas compressor and the LPPT. In further embodiments, the off-gas from the LPDT is recycled to the crude oil introduced to the LPPT.

In some embodiments, the system further includes a high pressure gas cooler fluidly coupled to the high pressure off-gas compressor and the first reboiler is operable to cool the compressed high pressure gas generating cooled gases, and a high pressure discharge knockout drum (KOD) fluidly coupled to the high pressure gas cooler operable to remove gas condensates and water from the cooled gases from the high pressure gas cooler. In some embodiments, the atmospheric pressure off-gas compressor is further fluidly coupled to the crude stabilizer column to accept atmospheric off-gas from the crude stabilizer column. In some embodiments, the system further includes a second reboiler fluidly coupled to the low pressure off-gas compressor operable to transfer heat from the compressed low pressure gas to the crude oil removed from and recycled to the crude stabilizer column.

In some embodiments, the first reboiler and second reboiler are fluidly coupled, and the crude oil removed from and recycled to the crude stabilizer column is heated through the first reboiler, and then heated through the second reboiler. In some further embodiments, a low total dissolved solids (TDS) water from the high pressure discharge KOD is introduced to the crude oil removed from and recycled to the crude stabilizer column. In some embodiments, the system is operable to refine crude oil in the crude oil inlet feed stream to produce a refined crude oil product safe for storage and shipment meeting the following specifications: (1) a salt concentration of not more than about 10 pounds (lbs.) of salt/1000 barrels (PTB); (2) basic sediment and water (BSW) of not more than about 0.3 volume percent (V %); (3) $H_2S$ concentration of less than about 60 ppmw; and (4) a maximum RVP of about 7 pounds per square inch absolute (psia) and a maximum true vapor pressure (TVP) of about 13.5 psia at 130 degrees Fahrenheit (° F.).

In some embodiments, the operating pressure within the LPPT is greater than the operating pressure in the LPDT. In some embodiments, the export gas stream generated from the high pressure off-gas compressor and the high pressure discharge KOD is recycled to the crude stabilizer column for use as a stripping gas. In some embodiments, an amount of the compressed high pressure gas used in indirect heating in the first reboiler is controlled by a high pressure bypass valve, and further where the high pressure bypass valve is controlled by a first temperature sensor located proximate to the crude oil removed from and recycled to the crude stabilizer column. In some further embodiments, an amount of the compressed low pressure gas used in indirect heating in the second reboiler is controlled by a low pressure bypass valve, and further where the low pressure bypass valve is controlled by a second temperature sensor located proximate to the crude oil removed from and recycled to the crude stabilizer column.

Further disclosed herein is an integrated gas oil separation method, the method including the steps of separating crude oil in a low pressure separator into a low pressure crude oil off-gas and a low pressure partially degassed crude oil output, compressing the low pressure crude oil off-gas to produce a compressed low pressure crude oil off-gas, separating the low pressure partially degassed crude oil output in an atmospheric separator into an atmospheric crude oil off-gas and an atmospheric partially degassed crude oil output, compressing the atmospheric crude oil off-gas to produce a compressed atmospheric crude oil off-gas, injecting the compressed atmospheric crude oil off-gas directly into the crude oil before the low pressure separator, desalting the atmospheric partially degassed crude oil output in a desalting vessel generating a desalted partially degassed crude oil output, stabilizing the desalted partially degassed crude oil output in a crude stabilizer column to produce a crude oil product, and applying the compressed low pressure crude oil off-gas for indirect heating of crude oil in a crude stabilizer column recycle stream through a first reboiler.

In some embodiments, the method also includes the steps of separating crude oil in a high pressure separator into a high pressure crude oil off-gas and a high pressure partially degassed crude oil output, introducing the high pressure partially degassed crude oil output to the low pressure separator, compressing the high pressure crude oil off-gas in a high pressure compressor, and applying the high pressure crude oil off-gas for indirect heating of crude oil in the crude stabilizer column recycle stream through a second reboiler. In some further embodiments, the method also includes the steps of cooling the high pressure crude oil off-gas in a high pressure cooler generating a cooled high pressure off-gas, and separating a low total dissolved solids (TDS) water stream from the cooled high pressure off-gas. In further embodiments, the method further includes the step of injecting the low TDS water stream into the crude stabilizer column recycle stream as the crude stabilizer column recycle stream is introduced to the first reboiler and the second reboiler.

In some embodiments, the method further includes the steps of compressing the compressed low pressure crude oil off-gas in a high pressure compressor generating a compressed high pressure gas stream, and applying the compressed high pressure gas stream for indirect heating of crude oil in the crude stabilizer column recycle stream through a second reboiler. In some embodiments, the method also includes the steps of cooling the low pressure crude oil off-gas in a low pressure cooler, and separating a water stream from the cooled low pressure off-gas in a low pressure knock-out drum (KOD). In some further embodiments, the compressed atmospheric crude oil off-gas comprises off-gas from the crude stabilizer column. In some embodiments, the method is operable to refine crude oil in the crude oil inlet feed stream to produce a refined crude oil product safe for storage and shipment meeting the following specifications: (1) a salt concentration of not more than about 10 pounds (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

In some embodiments, the method also includes the step of recycling an export gas stream generated from the high pressure off-gas compressor and the high pressure discharge KOD to the crude stabilizer column for use as a stripping gas. In some further embodiments, an amount of the compressed high pressure gas used in indirect heating in the first reboiler is controlled by a high pressure bypass valve, where the high pressure bypass valve is controlled by a first temperature sensor located proximate to the crude oil removed from and recycled to the crude stabilizer column. In some embodiments, an amount of the compressed low pressure gas used in indirect heating in the second reboiler is controlled by a low pressure bypass valve, where the low pressure bypass valve is controlled by a second temperature sensor located proximate to the crude oil removed from and recycled to the crude stabilizer column.

Further disclosed herein is an integrated gas oil separation plant system, the system including a crude oil inlet feed stream comprising crude oil, a high pressure production trap (HPPT) fluidly coupled to the crude oil inlet feed stream operable to separate gas from the crude oil in the crude oil inlet feed stream, a low pressure production trap (LPPT) fluidly coupled to the HPPT operable to separate gas from the crude oil, a low pressure degassing tank (LPDT) fluidly coupled to the LPPT operable to separate gas from the crude oil, a desalting vessel fluidly coupled to the LPDT operable to remove dissolved solids and separate water from the crude oil, a crude stabilizer column fluidly coupled to the desalting vessel operable to remove gas and impurities from the crude oil, a low pressure off-gas compressor fluidly coupled to the LPPT to compress low pressure off-gas from the LPPT for production of compressed low pressure gas for direct injection into the crude oil preceding introduction to the HPPT, an atmospheric pressure off-gas compressor fluidly coupled to the LPDT operable to compress atmospheric off-gas from the LPDT for production of compressed atmospheric gas for direct injection into the crude oil preceding introduction to the LPPT, a high pressure off-gas compressor fluidly coupled to the HPPT for production of compressed high pressure gas for use in indirect heating in a reboiler of the crude stabilizer column, and the reboiler fluidly coupled to the high pressure off-gas compressor and operable to transfer heat from the compressed high pressure gas to crude oil removed from and recycled to the crude stabilizer column.

In some embodiments, the system further includes a high pressure gas cooler fluidly coupled to the high pressure off-gas compressor and the first reboiler operable to cool the compressed high pressure gas generating cooled gases, and a high pressure discharge knockout drum (KOD) fluidly coupled to the high pressure gas cooler operable to remove gas condensates and water from the cooled gases from the high pressure gas cooler. In some embodiments, the atmospheric pressure off-gas compressor is further fluidly coupled to the crude stabilizer column to accept atmospheric off-gas from the crude stabilizer column. In some embodiments, a low total dissolve solids (TDS) water from the high pressure discharge KOD is introduced to the crude oil removed from and recycled to the crude stabilizer column as the crude stabilizer column recycle stream is introduced in the reboiler.

In some embodiments, the system is operable to refine crude oil in the crude oil inlet feed stream to produce a refined crude oil product safe for storage and shipment meeting the following specifications: (1) a salt concentration of not more than about 10 pounds (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.). In some embodiments, the operating pressure within the LPPT is greater than the operating pressure in the LPDT. In some embodiments, an export gas stream generated from the high pressure off-gas compressor and the high pressure discharge KOD is recycled to the crude stabilizer column for use as a stripping gas. In some embodiments, an amount of the compressed high pressure gas used in indirect heating in the reboiler is controlled by a high pressure bypass valve, and the high pressure bypass valve is controlled by a temperature sensor located proximate to the crude oil removed from and recycled to the crude stabilizer column.

Further disclosed herein is an integrated gas oil separation method, the method including the steps of separating crude oil in a high pressure separator into a high pressure crude oil off-gas and a high pressure partially degassed crude oil output, introducing the high pressure partially degassed crude oil output to a low pressure separator, compressing the high pressure crude oil off-gas in a high pressure compressor to produce a compressed high pressure crude oil off-gas, separating the high pressure partially degassed crude oil output in the low pressure separator into a low pressure crude oil off-gas and a low pressure partially degassed crude oil output, compressing the low pressure crude oil off-gas in a low pressure compressor to produce a compressed low pressure crude oil off-gas, injecting the compressed low pressure crude oil off-gas into the crude oil before the high pressure separator, separating the low pressure partially degassed crude oil output in an atmospheric separator into an atmospheric crude oil off-gas and an atmospheric partially degassed crude oil output, compressing the atmospheric crude oil off-gas in an atmospheric compressor to produce a compressed atmospheric crude oil off-gas, injecting the compressed atmospheric crude oil off-gas directly into the crude oil before the low pressure separator, desalting the atmospheric partially degassed crude oil output in a desalting vessel generating a desalted partially degassed crude oil output, stabilizing the desalted partially degassed crude oil output in a crude stabilizer column to produce a crude oil product, and applying the compressed high pressure crude oil off-gas for indirect heating of crude oil in a crude stabilizer column recycle stream through a reboiler.

In some embodiments, the method also includes the steps of cooling the compressed high pressure crude oil off-gas in a cooler generating a cooled high pressure off-gas, and separating a low total dissolved solids (TDS) water stream from the cooled high pressure off-gas. In further embodiments, the method includes the step of injecting the low TDS water stream into the crude stabilizer column recycle stream as the crude stabilizer column recycle stream is introduced in the first reboiler and the second reboiler. In some embodiments, the compressed atmospheric crude oil off-gas includes off-gas from the crude stabilizer column. In some embodiments, the method is operable to refine crude oil in the crude oil inlet feed stream to produce a refined crude oil product safe for storage and shipment meeting the following specifications: (1) a salt concentration of not more than about 10 pounds (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

In some embodiments, the operating pressure within the LPPT is greater than the operating pressure in the LPDT. In some embodiments, the method also includes the step of recycling an export gas stream generated from the high pressure compressor to the crude stabilizer column for use as a stripping gas. In some embodiments, an amount of the compressed high pressure gas used in indirect heating in the reboiler is controlled by a high pressure bypass valve, and the high pressure bypass valve is controlled by a temperature sensor located proximate to the crude oil removed from and recycled to the crude stabilizer column.

Further disclosed herein is an integrated gas oil separation plant system, the system including a crude oil inlet feed stream comprising crude oil, a low pressure production trap (LPPT) fluidly coupled to the crude oil inlet feed stream operable to separate gas from the crude oil in the crude oil inlet feed stream, a low pressure degassing tank (LPDT) fluidly coupled to the LPPT operable to separate an atmospheric off-gas from the crude oil, a desalting vessel fluidly coupled to the LPDT operable to removed dissolved solids and separate water from the crude oil, a crude storage tank fluidly coupled to the desalting vessel operable to remove gas from the crude oil, an atmospheric pressure off-gas compressor fluidly coupled to the LPDT operable to compress the atmospheric off-gas from the LPDT for production of the compressed atmospheric gas for direct injection into the crude oil in the crude oil inlet feed stream before introduction to the LPPT, a low pressure off-gas compressor fluidly coupled to the LPPT operable to compress off-gas from the LPPT for production of a compressed low pressure gas for use in indirect heating in a first heat exchanger, and a high pressure off-gas compressor fluidly coupled to the low pressure off-gas compressor for production of a compressed high pressure gas for use in indirect heating in a second heat exchanger. The system also includes the first heat exchanger fluidly coupled to the low pressure off-gas compressor and the LPDT, the first heat exchanger operable to transfer heat from the compressed low pressure gas to the crude oil before introduction to the desalting vessel; and the second heat exchanger fluidly coupled to the high pressure off-gas compressor and the LPDT, the second heat exchanger operable to transfer heat from the compressed low pressure gas to the crude oil before introduction to the desalting vessel.

In some embodiments, the system also includes a high pressure cooler fluidly coupled to the high pressure compressor operable to cool the compressed high pressure gas generating a cooled high pressure gas, and a high pressure discharge knockout drum (KOD) fluidly coupled to the second cooler operable to remove gas condensates and water from the cooled high pressure gas from the first cooler. In some embodiments, the atmospheric pressure off-gas compressor is further fluidly coupled to the crude storage tank to accept atmospheric off-gas from the crude storage tank. In some embodiments, the system is operable to refine crude oil in the crude oil inlet feed stream to produce a refined crude oil product safe for storage and shipment meeting the following specifications: (1) a salt concentration of not more than about 10 pounds (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

In some embodiments, the operating pressure within the LPPT is greater than the operating pressure in the LPDT. In some embodiments, an amount of the compressed high pressure gas used in indirect heating in the first heat exchanger is controlled by a high pressure bypass valve, and the high pressure bypass valve is controlled by a first temperature sensor located proximate the crude oil before introduction to the desalting vessel. In some embodiments, an amount of the compressed low pressure gas used in indirect heating in the second heat exchanger is controlled by a low pressure bypass valve, and the low pressure bypass valve is controlled by a second temperature sensor located proximate the crude oil before introduction to the desalting vessel.

Further disclosed herein is an integrated gas oil separation method, the method including the steps of separating crude oil in a low pressure separator into a low pressure crude oil off-gas and a low pressure partially degassed crude oil output, compressing the low pressure crude oil off-gas to produce a compressed low pressure crude oil off-gas, separating the low pressure partially degassed crude oil output in an atmospheric separator into an atmospheric crude oil off-gas and an atmospheric partially degassed crude oil output, compressing the atmospheric crude oil off-gas to produce a compressed atmospheric crude oil off-gas, injecting the compressed atmospheric crude oil off-gas directly into the crude oil before the low pressure separator, desalting the atmospheric partially degassed crude oil output in a desalting vessel generating a desalted partially degassed crude oil output, separating off-gas from the desalted partially degassed crude oil output in a crude storage tank to produce a crude oil product, applying the compressed low pressure crude oil off-gas for indirect heating of the crude oil before introduction into the desalting vessel through a first heat exchanger, and applying the compressed high pressure crude oil off-gas for indirect heating of the crude oil before introduction into the desalting vessel through a second heat exchanger.

In some embodiments, the method also includes the steps of cooling the high pressure crude oil off-gas in a high pressure cooler generating a cooled high pressure off-gas, and separating a low total dissolved solids (TDS) water stream from the cooled high pressure off-gas. In some embodiments, the method also includes the steps of cooling the compressed low pressure crude oil off-gas in a low pressure cooler generating a cooled low pressure off-gas, and separating a water stream from the cooled low pressure off-gas in a low pressure knockout drum (KOD). In some further embodiments, the method also includes the step of compressing the cooled low pressure off-gas in the high pressure compressor. In some embodiments, the compressed atmospheric crude oil off-gas includes off-gas from the crude storage tank. In some embodiments, the method is operable to refine crude oil in the crude oil inlet feed stream to produce a refined crude oil product safe for storage and shipment meeting the following specifications: (1) a salt concentration of not more than about 10 pounds (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.). In some embodiments, an amount of the compressed high pressure gas used in indirect heating in the first heat exchanger is controlled by a high pressure bypass valve, and the high pressure bypass valve is controlled by a first temperature sensor located proximate to the crude oil before introduction to the desalting vessel. In some embodiments, an amount of the compressed low pressure gas used in indirect heating in the second heat exchanger is controlled by a low pressure bypass valve, and the low pressure bypass valve is controlled by a second temperature sensor located proximate to the crude oil before introduction to the desalting vessel.

BRIEF DESCRIPTION OF THE DRAWINGS

These and other features, aspects, and advantages of the disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
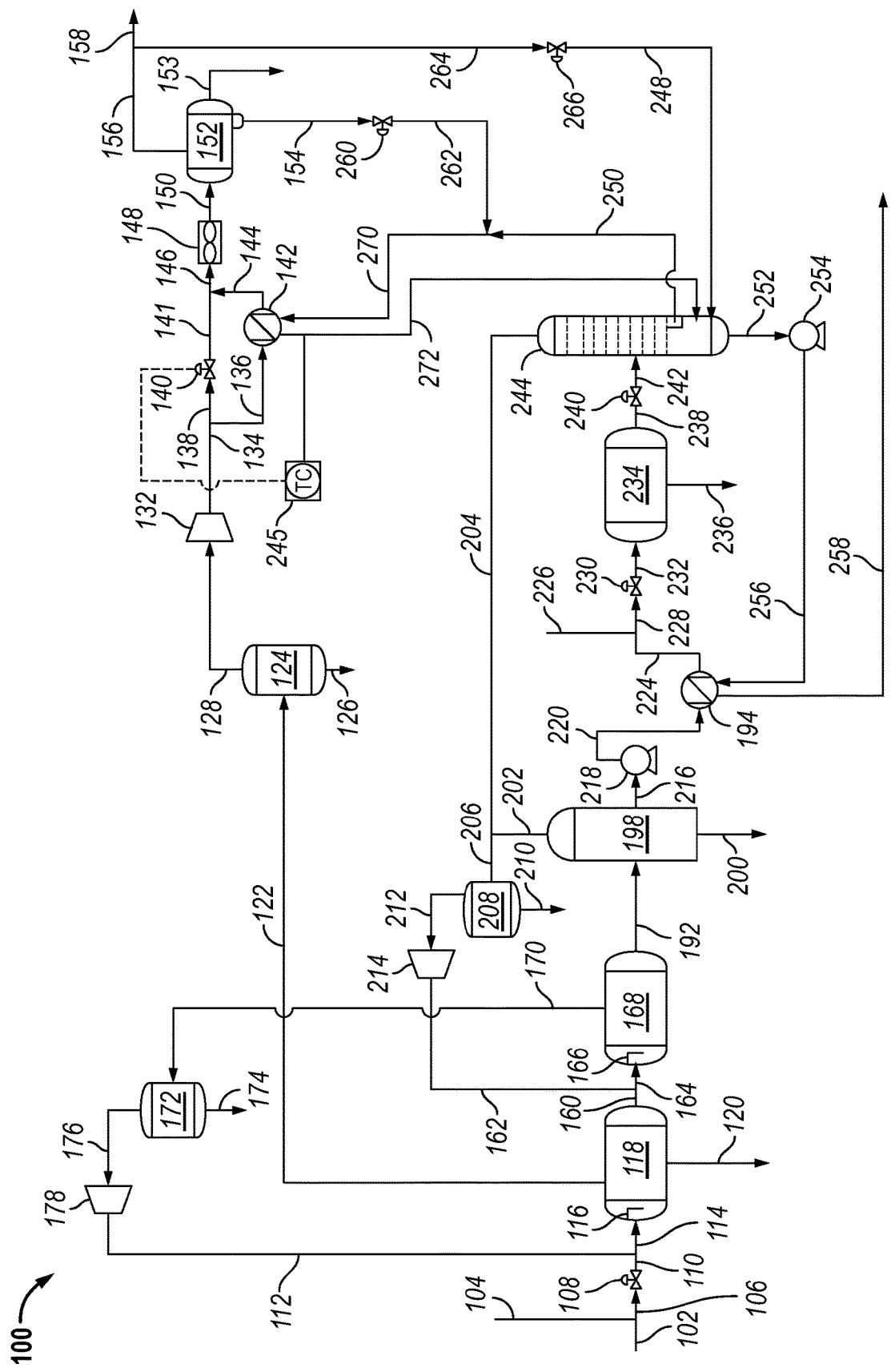
FIG. 1 is a schematic diagram showing an integrated GOSP of the present disclosure with application of high pressure (HP) gas for indirect heating of crude oil within a reboiler.

While the disclosure will be described in connection with several embodiments, it will be understood that it is not intended to limit the disclosure to those embodiments. On the contrary, it is intended to cover all the alternatives, modifications, and equivalents as may be included within the spirit and scope of the disclosure defined by the appended claims.

Conventional GOSP's suffer from many deficiencies including low product yield, inefficient use of available heat sources such as for example the discharge streams of compressors, many separate units being used to meet product specifications, high operating costs due to heating requirements, a large spatial footprint, and high capital cost.

In general, a GOSP is a continuous separation system and process that includes a high pressure production trap (HPPT), a low pressure production trap (LPPT), a low pressure degassing tank (LPDT), a dehydrator unit, first and second stage desalting units, a water/oil separation plant (WOSEP), a stabilizer column, atmospheric compressors, low pressure compressors, high pressure compressors, centrifugal pumps, heat exchangers, and reboilers. In a conventional GOSP, pressure is often reduced in several stages to allow for the controlled separation of volatile components. Objectives of a GOSP include achieving maximum liquid recovery of stabilized oil and water, and gas separation. However, a large pressure reduction in a single separator will cause flash vaporization, leading to instability and safety hazards. In the embodiments of the figures described here, other units not pictured such as those described supra can be applied, depending on the quality of inlet crude oil and other factors. For example, a stabilizer column and stripping gas can be applied for crude oil with high sulfur content.

Prior art GOSP systems and processes generally include 3 separate stages in large-footprint plants and processes. In a first stage, gas, crude oil, and free water are separated. In a second stage, crude oil is dehydrated and desalted to separate emulsified water and salt to meet certain basic sediment and water (BS&W) specifications. In a third stage, crude oil is stabilized and sweetened to meet hydrogen sulfide ($H_2S$) and Reid Vapor Pressure (RVP) specifications. Generally, sour crude oil refers to any crude oil with a total sulfur level of more than about 0.5% by weight. In upstream operations, as described herein, the phrase sour crude also refers to any crude oil with an $H_2S$ content higher than about 60 ppm by weight, and sweet crude oil refers to any crude oil that has an $H_2S$ content of less than about 60 ppm by weight.

After stabilization and sweetening, the crude oil should meet all specifications required for shipment, transport, and storage. These specifications include the following: (1) a salt concentration of not more than about 10 PTB; (2) BS&W of not more than about 0.3 V %; (3) $H_2S$ content of less than about 60 ppm in the crude stabilization tower (or degassing vessels in the case of sweet crude); and (4) a maximum RVP of about 7 psia and a maximum TVP of about 13.5 psia at 130° F. Importantly, embodiments shown in the present disclosure allow for the elimination of any HPPT preceding a LPPT, for example in FIGS. 3 and 4.

In embodiments of the present disclosure, high pressure off-gases and high pressure compressed gases are in a pressure range from about 135 psig or about 170 psig to about 500 psig, low pressure off-gases and low pressure compressed gases are in a pressure range from about 35 psig or about 70 psig to about 180 psig, and atmospheric pressure off-gases and atmospheric pressure compressed gases are in a range from about 3 psig to about 80 psig. The temperature of the off-gases depends, in part, on the source of the crude oil. For example, the initial temperature for crude oil originating from offshore oil rigs ranges between about 55° F. to about 100° F., while the temperature of crude oil originating from onshore oil fields ranges from about 100° F. to about 150° F. In some embodiments of the present disclosure, a wet and unstabilized crude oil from oil production wells, either or both onshore or offshore, can be between about 40° F. and 80° F. In some embodiments, the temperature of high pressure off-gas from an HPPT is about 95° F., the temperature of low pressure off-gas from a LPPT is about 95° F. (with no heater preceding the LPPT), and the temperature of the atmospheric pressure off-gas from a LPDT is about 125° F., due to a heater (heat exchanger) preceding the LPDT. One or more HPPT, LPPT, and/or LPDT can precede the systems described here, and one or more stabilization tower can follow, with stripping gas applied as needed in any of the vessels.

In some embodiments of the present disclosure, the operating temperatures of a HPPT and LPPT are substantially the same when no heater (heat exchanger) or heating stream injection precedes the units. In some embodiments, the operating pressure of the HPPT is about 150 psig, the operating pressure of the LPPT is about 50 psig, and the operating pressure of the LPDT is about 3 psig. In some embodiments, no HPPT is required. In some embodiments, the operating temperatures of the HPPT and LPPT are about 95° F., while the operating temperature of the LPDT is about 125° F.

In a HPPT, lighter hydrocarbon gases in the crude oil separate from the heavier liquid hydrocarbons. A plurality of electrostatic electrodes simultaneously dehydrates crude oil and removes a majority of emulsified water, for example up to about 98 volume %. The outputs from a HPPT are off-gas, which goes to a gas gathering system (HP Compressor), formation water, discharged for collection to a water/oil separation plant (WOSEP), and partially dried crude oil which goes to LPPT for further processing. In some embodiments, the HPPT is not utilized.

Partially dried crude oil originating from a HPPT unit is mixed with the recycled gas from a crude stabilizer tower. Crude is then passed to the three-phase separator LPPT, where the operating pressure is lower than the HPPT, and is also equipped with a plurality of insulated electrostatic electrodes to remove any remaining off-gas and emulsified water. The LPPT is a horizontal three-phase separation vessel. The operating pressure of the LPPT is lower than the HPPT to allow the removal of additional hydrocarbon off-gases. In some embodiments, LPPT pressure is about ⅓ of the HPPT pressure to maximize liquid recovery. The outputs of the LPPT are off-gas which goes to the gas gathering system (LP Compressor) for treatment or recycling to the crude streams, formation water, and partially dried crude oil which goes to a LPDT for desalting and stabilization.

Dry crude oil from the LPPT unit still contains light components or impurities that need to be further reduced. These impurities include $H_2S$, $N_2$, $CO_2$, $CH_4$, $C_2H_4$, $C_3H_6$, water, or any other suspended solids or light gases. The dry crude from either the LPPT or the LPDT can be heated in direct or indirect heat exchangers. Heating the crude makes it easier to separate out gas and enhances the desalting efficiency. The dry crude is mixed with fresh wash water in a mixing valve or any other mixers to disperse the water into small, fine droplets to reduce the salt content concentration or any other impurities. Low salinity wash water rinses the remaining salt from the crude oil. Fresh wash water is used in desalter processes and units to ensure that the maximum amount of salt is rinsed from the wet crude oil.

Crude can be introduced to heat exchangers to increase the temperature to the optimum desalting/stabilizing temperature before introduction to various vessels, including the LPDT. Heating the wet crude makes it easier to separate out gas and enhances the desalting efficiency. Electrostatic coalescence removes the remaining water emulsion from the wet crude oil. Emulsion separation vessel technology described in U.S. Pat. No. 10,513,663 is suitable in certain embodiments of the present disclosure and is incorporated here by reference in its entirety.

Crude then enters the LPDT vessel operating at a lower pressure than the LPPT enough to remove the gas impurities from the crude and to meet the required $RVP/H_2S$ content. The operating pressure can range from as high as 10 psig to vacuum conditions.

Overhead gas from the HPPT unit and the LPPT unit can be compressed. After compression, the off-gas is cooled in a cooler and liquids are removed in knock-out drums. Knock-out drum technology described in U.S. Pat. No. 10,384,161 is suitable in certain embodiments of the present disclosure and is incorporated here by reference in its entirety. Then, the off-gas is routed through reboilers. The reboilers heat the crude stabilizer crude stream with the off-gas stream to increase efficiency for removal of impurities from the crude oil in the crude stabilizer. In some embodiments, the overhead gas is routed through heat exchangers to heat the crude stream before treatment in the dehydrator and desalter vessels. After use in the reboilers, the gas is treated in aftercoolers, knockout drums, and in other gas separation equipment.

After degassing in the HPPT, LPPT, and LPDT, the crude can be treated in one or more desalting vessels as needed. The desalting vessels can include one or more integrated or separate dehydrator and desalter. Second stage desalters are not required in certain embodiments of the present disclosure. In some embodiments of the present disclosure, the operating temperatures of a dehydrator and a first or second stage desalter are in the range of 130° F. to 160° F. In some embodiments, the operating pressure of the dehydrator is about 25 psi above the crude vapor pressure. In some embodiments, the operating pressure of the dehydrator or desalter is greater than about 35 psig. Crude oil fed to a desalter is required to be below its bubble point to ensure no free vapor is liberated in the process. Desalters are designed to be 'gas free,' since the presence of vapor in a high voltage field can cause arcing which in turn leads to more vapor formation.

After crude oil is degassed, dehydrated, and desalted, the crude can be sent to a hot or cold crude stabilizer column, if needed, which performs sweetening and stabilization to meet the crude specification for $H_2S$ in the range of 10 to 60 ppmw, for safety and corrosion prevention. The stabilization process begins by heating the unstabilized crude. Crude is distributed onto the top tray of the stabilizer column, and flows through the trays to a draw-off tray. The crude stabilizer column can have, for example, up to sixteen trays. A stripping gas stream injection at approximately 12 lb/1000 barrel can be injected into the bottom of the crude stabilizer column. Light components in the crude oil vaporize and rise through the stabilizer trays. $H_2S$ and light components are removed in the gas stream. The crude stabilizer column is used to meet RVP and $H_2S$ specifications. The operating temperature of a hot crude stabilizer column with reboilers can be in the range of 140° F. to 160° F. and the pressure ranges from 3 to 5 psig.

In embodiments described herein, model or multivariable predictive controllers (MPC's) and multivariable controllers (MVC's) can be used to control dried, desalted crude oil product specifications below the set process variables of salt content in PTB less than about 10 PTB and BS&W of less than about 0.2 volume percent. MPC's and MVC's can be used to control the plant specifications below the max allowable limits discussed above. Signals can be wired in addition to or alternative to wireless, and can provide information one way to MPC's or MVC's or two ways between an MPC or an MVC and a control unit or measurement unit. Manipulated variables in the MPC or MVC to meet the above specifications include: demulsifier injection rate, wash water application rate and salinity, desalter voltage and current, mixing valve pressure drop, unit interface levels, trim heater temperature, stabilizer reboiler temperature, and stripping gas injection rate, if required.

Referring now to FIG. 1, a schematic diagram is presented showing an integrated GOSP of the present disclosure with application of high pressure gas for indirect heating of crude oil within a reboiler. Direct injection of atmospheric compressor hot gas into the incoming crude oil to a LPPT directly and simultaneously heats the crude and cools the compressed gas. The compressed hot gas will work as a stripping gas in the LPPT and enables meeting $H_2S$ crude specifications, for example of about 10 ppmw using a crude oil stabilizer with about 16 actual trays, along with optional steam injection and stripping gas injection. Steam and stripping gas can also be injected at a LPDT as needed. Similarly, direct injection of low pressure compressor hot gas into the incoming crude oil to an HPPT directly and simultaneously heats the crude and cools the compressed gas. Additional compressed gasses from the high pressure compressor are used in a first reboiler to heat crude within the crude stabilizer. The embodiments of FIGS. 1-4 advantageously improve the treated crude oil yield while reducing outside heating requirements.

In embodiments similar to that of FIG. 1, the volume to volume for wash water at wash water injection points to oil is between about 1 to 9 volume % depending on the wash water salt content and the tightness of a crude oil-in-water emulsion. A lesser V/V wash water to oil ratio is used when the salt content of the wash water is less than 1000 ppmw. The higher the salt content, the higher the wash water to oil volume ratio. For example, V/V for recycle water to oil is between about 5 to 9 volume %.

In FIG. 1, GOSP system 100 accepts a sour crude oil inlet stream 102 and sour crude oil inlet stream 102 is optionally mixed with demulsifier from demulsifier stream 104, generating demulsified crude stream 106 containing crude oil and optional demulsifier. Demulsified crude stream 106 enters slug valve 108, and exits as stream 110. Compressed low pressure gas stream 112 from low pressure compressor 178 is introduced and directly mixed into to stream 110, forming HPPT crude oil feed stream 114. Compressed low pressure gas stream 112 acts as both a source of heat for the crude oil and as a stripping gas for $H_2S$ in HPPT 118 once HPPT crude oil feed stream 114 is introduced to HPPT 118. HPPT crude oil feed stream 114 enters HPPT 118 through HPPT inlet diverter 116. In HPPT 118, the pressure results in certain heavy entrained gas separating from the liquid phases, while water and oil separate into layers within the vessel. High pressure (HP) off-gas stream 122 exits HPPT 118 and is processed through first HP knock-out drum (KOD) 124, which separates the gas and liquid components, generating liquids stream 126, comprising for example gas condensates and/or water.

Gas stream 128 is removed from first HP KOD 124, and introduced to HP compressor 132. HP compressor 132 generates stream 134. First reboiler gas stream 136 is split from stream 134 and introduced to first reboiler 142, where it indirectly heats crude from crude stabilizer column 244. In some embodiments, first reboiler 142 has a temperature in the range of about 160 to 220° F. In some embodiments, the temperature of first reboiler 142 is varied depending on the required heating to meet the end product specifications. Stream 144 exits first reboiler 142. Stream 144 is at a lower temperature than first reboiler gas stream 136. Bypass stream 138, split from stream 134, enters bypass valve 140, which controls the flow of gas through first reboiler 142. Bypass valve 140 is controlled in response to measurements by first temperature sensor 245. Stream 141 exits bypass valve 140, and mixes with stream 144 to generate HP cooler feed stream 146. Bypass valve 140 can be 100% open or 100% closed, or any level in between, depending on heating required by first reboiler 142 and the temperature desired in first reboiler 142, indicated by first temperature sensor 245.

HP cooler feed stream 146 is introduced to HP cooler 148. HP cooler 148 can be an air cooler, an indirect shell and tube heat exchanger cooler, and any combination of compressor aftercoolers known in the art. Stream 150 exits HP cooler 148, and is introduced to second HP KOD 152. Stream 150 can be in a temperature range of about 40° F. to 200° F. Low total dissolved solids (TDS) water stream 154 is removed from second HP KOD 152. Flow rate of low total dissolved solids (TDS) water stream 154 is controlled through water control valve 260, generating low TDS stabilizer stream 262, which is recycled to crude stabilizer column 244 via stream 270, first reboiler 142, and stream 272. HP gas stream 156 exits second HP KOD 152. Recycle stripping gas stream 264 is removed from HP gas steam 156, generating export gas stream 158. Low TDS water stream 154 can be used with a lesser V/V wash water to oil ratio when the salt content of the wash water is less than 1000 ppmw. The higher the salt content, the higher the wash water to oil volume ratio. For example, V/V for recycle water to oil is between about 5 to 9 volume %.

Partially de-gassed and dried crude oil proceeds from HPPT 118 as stream 160, which mixes with compressed atmospheric gas stream 162, generating LPPT feed stream 164. Compressed atmospheric gas stream 162, directly mixed with the crude oil, acts as a source of heat and as a stripping gas for $H_2S$ in LPPT 168 once the oil and gas mixture proceeds to LPPT 168 by LPPT feed stream 164. LPPT feed stream 164 enters LPPT 168 through LPPT inlet diverter 166, which can increase mixing of the components of the inlet feed. LPPT 168 generates low pressure (LP) off-gas stream 170. In some embodiments, HPPT's, LPPT's, LPDT's, desalters, and/or dehydrators comprise fully insulated electrostatic electrodes and a weir, whereby an oil-water emulsion for separation is disposed proximate the weir, and can be removed as required based on the level of oil-water emulsion within the vessel and operating parameters of the fully-insulated electrostatic electrodes.

LP off-gas stream 170 is introduced to LP compressor suction KOD 172, where additional liquid stream 174 is removed, for example comprising water in addition to or alternative to gas condensates. LP gas stream 176 exits LP compressor suction KOD 172 and enters LP compressor 178. Compressed LP gas stream 112 exits LP compressor 178 for mixing with inlet crude oil.

Partially-treated dried and de-gassed crude oil exits LPPT 168 and proceeds via stream 192 to LPDT 198. LPDT 198 separates the oil from remaining gas and water, generating LPDT water stream 200 to a WOSEP, not pictured, and LPDT off-gas stream 202. LPDT off-gas stream 202 is combined with crude stabilizer gas stream 204 to generate combined gas stream 206. Combined gas stream 206 is introduced to atmospheric KOD 208, which separates liquid stream 210 from atmospheric gas stream 212. Atmospheric gas stream 212 is introduced to atmospheric compressor 214, which compresses the gas generating compressed atmospheric gas stream 162 for mixing with crude oil.

Degassed and dried crude oil proceeds out of LPDT 198 via stream 216, and enters crude charge pump 218. Stream 220 from crude charge pump 218 is introduced to first heat exchanger 194. First heat exchanger 194 heats stream 220 using crude stream 256 from crude stabilizer column 244. Heated, degassed, and partially-dried crude oil stream 224 exits first heat exchanger 194.

Wash water stream 226 (comprising fresh and/or recycle wash water) is added to stream 224 generating mixed stream 228. Mixed stream 228 is thoroughly mixed by mixing valve 230 generating desalting vessel feed stream 232. A pressure drop across mixing valve 230 can be controlled to increase the mixing of the components. Desalting vessel feed stream 232 is introduced to desalting vessel 234 for desalting, for example to meet PTB system specifications. In some embodiments desalters and dehydrators can be separate or integrated. Desalting vessel 234 can be any type of vessel capable of desalting crude, such as a dehydrator or a desalter. Desalting vessel 234 generates desalted oil stream 238, and a salty water stream 236 to a WOSEP (not pictured).

Degassed, dried, and desalted crude oil next proceeds via stream 238 to control valve 240, which controls the flow rate of stabilizer feed stream 242 to crude stabilizer column 244. Stripping gas stream 248 is also introduced to crude stabilizer column 244. Stripping gas stream 248 is generated from split gas stream 264, removed from HP gas stream 156. The flow rate of stripping gas stream 248 is controlled by stripping gas control valve 266. Sweet stripping gas can be added to the system as needed, for example to meet $H_2S$ specifications. In some embodiments, hydrogen, nitrogen, steam, and/or other stripping gasses are applied to meet an $H_2S$ crude specifications of about 10 ppm, optionally using a crude oil stabilizer with 16 actual trays along with steam injection. Steam can be used to strip $H_2S$ gas from crude oil in addition to or alternative to any other suitable stripping gas that is low in $H_2S$ concentration relative to the crude oil. Suitable stripping gas streams include natural gas low in $H_2S$ concentration (such as methane and ethane), steam, and nitrogen ($N_2$). Crude stabilizer column 244 removes gas and impurities from the crude oil, generating stabilized crude stream 252. Stabilized crude stream 252 enters crude shipping pump 254, generating crude stream 256. After crude stream 256 heats stream 220 in first heat exchanger 194, export crude stream 258 is generated.

Crude stabilizer column 244 also generates crude recycle stream 250, which is heated in first reboiler 142 and recycled to crude stabilizer column 244 via stream 272 to improve recovery of gas and removal of impurities from the crude oil. Low TDS stabilizer stream 262 is introduced to crude recycle stream 250, generating combined crude recycle stream 270. Advantageously, recycling the low TDS water from the HP compressor 132 discharge KOD (second HP KOD 152) minimizes scaling in first reboiler 142, and minimizes the reboiler temperature needed to meet crude specifications. The injection of the low TDS water assists in stripping light gases such as $CH_4$, $C_2H_6$, $C_3H_8$, $H_2S$, $CO_2$, and $N_2$ from the crude oil at a lower reboiler temperature than the reboiler temperature that would be required without the water injection. These light gases affect the crude quality. Advantageously, the reduction in the reboiler temperature needed to meet crude specifications reduces energy requirements in the system. Combined crude recycle stream 270 is introduced to first reboiler 142, and is indirectly heated by first reboiler gas stream 136, generating stream 272. The temperature of stream 272 is monitored by first temperature sensor 245 and controlled by bypass valve 140. Additional temperature sensors can be provided to provide information and control bypass valve 140.

Figure 2:
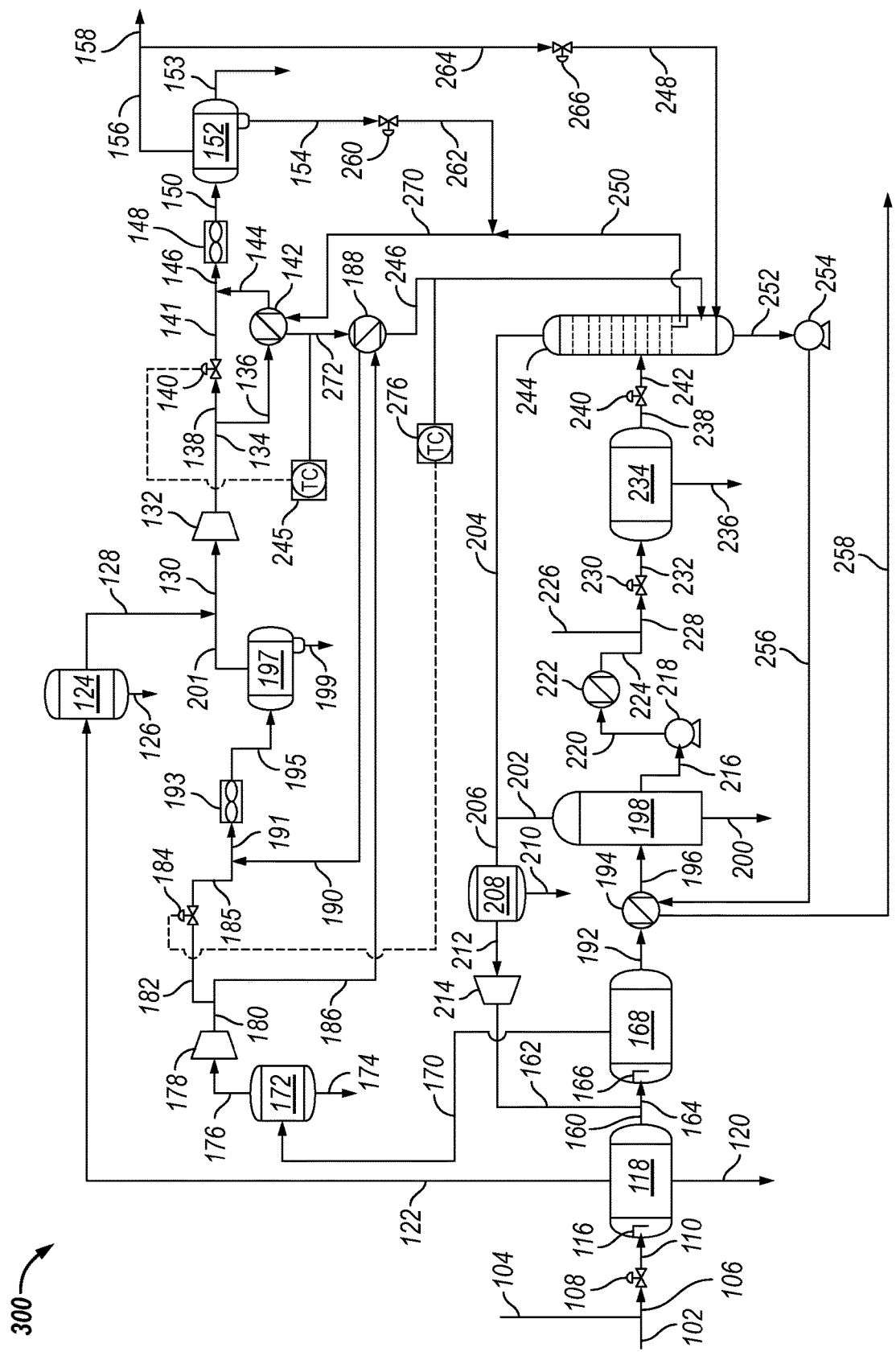
FIG. 2 is a schematic diagram showing an integrated GOSP of the present disclosure with application of gas for indirect heating of crude oil within two reboilers, including indirect heating of crude from both low pressure (LP) and HP off-gas streams.

Referring to FIG. 2, a schematic diagram is presented showing an integrated GOSP of the present disclosure with application of gas for indirect heating of crude oil within a reboiler, including indirect heating of crude from both LP and HP off-gas streams. Similarly labeled components to those of FIG. 1 are similar to those described for FIG. 1. In GOSP system 300 of FIG. 2, an additional reboiler is used to heat the crude stabilizer recycle, and the low pressure compressor discharge is used as the heating media for the second reboiler.

Throughout the figures, similarly labeled components represent similar features as those previously described. FIG. 2 shows stream 110 being introduced directly to HPPT 118, without an addition of a gas stream introduced directly to the crude oil stream 102. After compression in LP compressor 178, the gas is routed through a second reboiler 188 and the HP compressor 132. LP compressor discharge 180 exits LP compressor 178 and is split into LP bypass stream 182, controlled by bypass valve 184, and LP reboiler feed stream 186. Bypass valve 184 is controlled by second temperature sensor 276, which measures the temperature of the crude stream leaving the second reboiler 188. Bypass valve 184 can be 100% open or 100% closed, or any amount in between, to reach a predetermined, desired temperature at temperature second sensor 276, which can include an automated temperature control. Additional temperature sensors can be provided to provide information and control bypass valve 184.

LP reboiler feed stream 186 is introduced to second reboiler 188, which indirectly heats crude from crude stabilizer column 244. The gas exits second reboiler 188 in second reboiler return stream 190. Second reboiler return stream 190 is introduced to bypassed stream 185, exiting bypass valve 184, to form LP cooler feed stream 191. Once combined, LP cooler feed stream 191 is introduced to LP cooler 193. Stream 195 exits LP cooler 193 and enters LP discharge KOD 197, where LP discharge KOD water stream 199 is separated from the gas stream, stream 201. Stream 201 is combined with gas stream 128, generating combined HP compressor feed 130. Combined HP compressor feed 130 is introduced to HP compressor 132.

Stream 192 exits LPPT 168 and enters first heat exchanger 194, which heats the crude stream before introduction to the LPDT 198. Stream 196 exits first heat exchanger 194 and is introduced to LPDT 198. Stream 220, which exits crude charge pump 218, is introduced to second heat exchanger 222, which heats the crude stream before the desalting vessel. Stream 224 exits second heat exchanger 222.

Advantageously, crude from the crude stabilizer column is heated through two reboilers utilizing waste heat from compressor discharge streams. Crude recycle stream 250 is removed from crude stabilizer column 244 and mixes with low TDS stabilizer stream 262 to form combined crude recycle stream 270. Combined crude recycle stream 270 is heated in first reboiler 142, generating stream 272. The temperature of stream 272 is monitored by first temperature sensor 245. Stream 272 is then heated in second reboiler 188, generating heated crude recycle stream 246. The temperature of heated crude recycle stream 246 is monitored and optionally controlled by second temperature sensor 276. Additional temperature sensors can be provided to provide information and control bypass valve 184.

Figure 3:
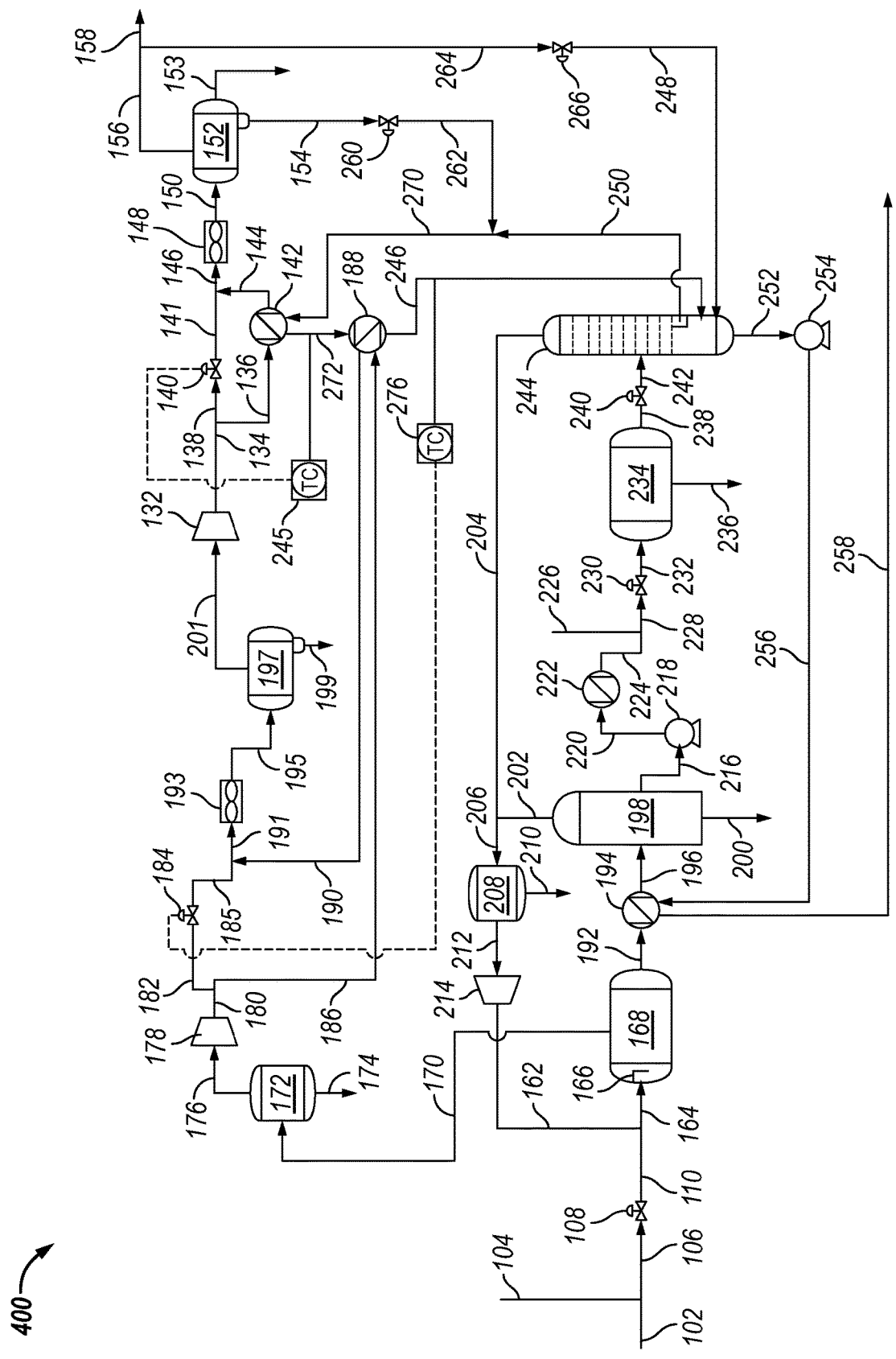
FIG. 3 is a schematic diagram showing an integrated GOSP of the present disclosure with application of gas for indirect heating of crude oil within two reboilers.

Referring now to FIG. 3, a schematic diagram is presented showing an integrated GOSP of the present disclosure with application of gas for indirect heating of crude oil within two reboilers. Similarly labeled components to those of FIGS. 1 and 2 are similar to those described for FIGS. 1 and 2. In GOSP system 400 of FIG. 3, the second reboiler 188 is also used to heat the crude stabilizer recycle. Also, no HPPT is shown or required in GOSP system 400. FIG. 3 shows LP off-gas stream 170 from LPPT 168 is sent first through LP compressor 178, then to HP compressor 132. Stream 201 from LP discharge KOD 197 is introduced to directly to HP compressor 132 without mixing with another stream.

Figure 4:
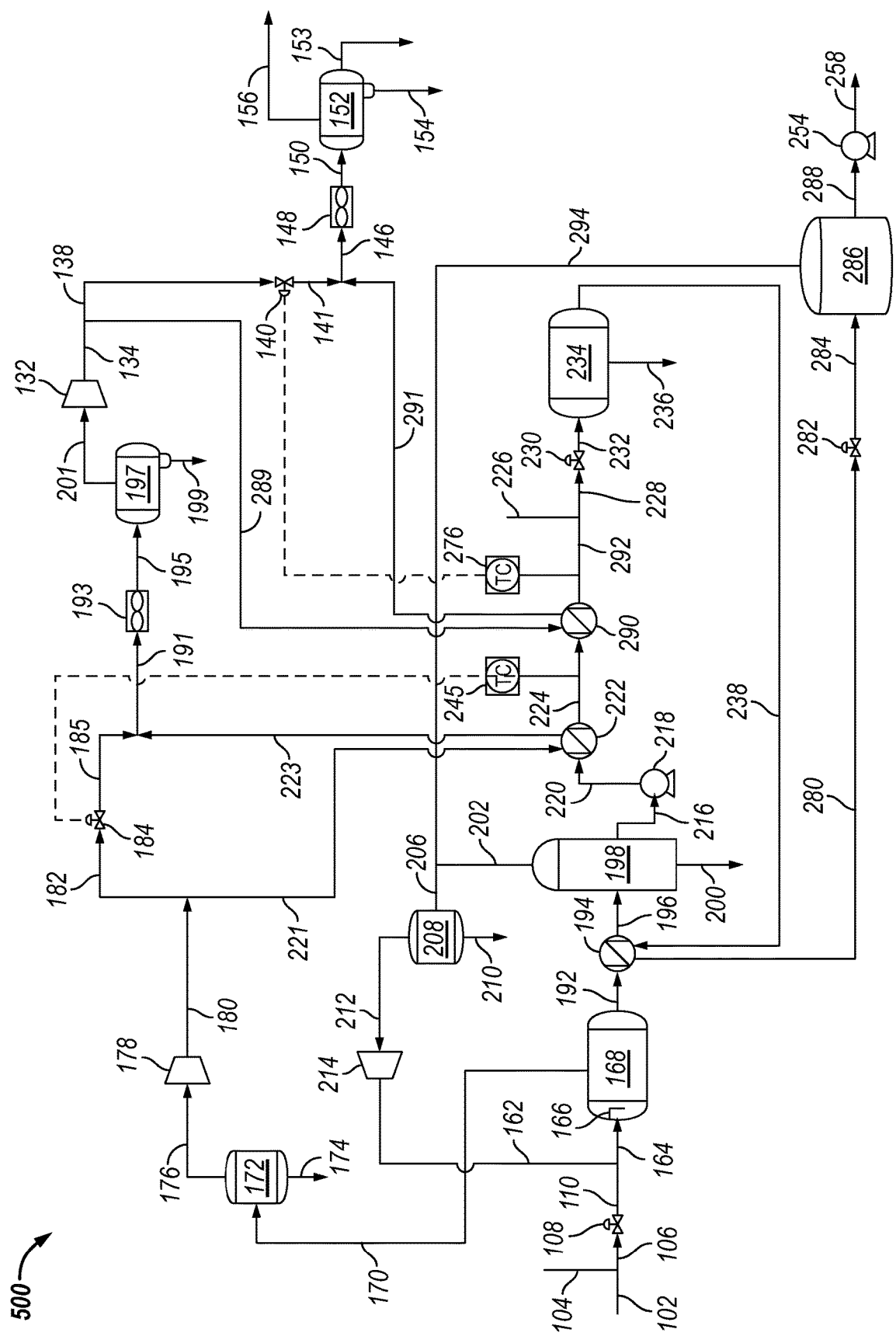
FIG. 4 is a schematic diagram showing an integrated GOSP of the present disclosure with application of gas for indirect heating of crude oil within heat exchangers.

Referring now to FIG. 4, a schematic diagram is presented showing an integrated GOSP of the present disclosure with application of gas for indirect heating of crude oil with heat exchangers. Similarly labeled components to those of FIGS. 1, 2, and 3 are similar to those described for FIGS. 1, 2, and 3. In GOSP system 500 of FIG. 4, heat exchangers are used to transfer heat from the compressor discharge gas streams to the crude oil sent to desalting vessel 234. Importantly, in the embodiment of FIG. 4, no HPPT and no crude stabilizer column is shown or required, for example in an embodiment with low sulfur content crude oil or sweet crude oil. Instead, the degassed, dehydrated, and desalted crude is sent through a heat exchanger to heat the crude introduced to the LPDT, and then to a dry crude storage tank.

FIG. 4 shows LP compressor discharge 180 split into LP bypass stream 182 and stream 221, controlled by bypass valve 184. Bypass valve 184 is controlled by first temperature sensor 245, which measures the temperature of the crude in stream 224. Stream 221 is introduced to second heat exchanger 222, which heats crude oil being sent to desalting vessel 234. Stream 223 exits second heat exchanger 222, and is mixed with bypassed stream 185 to form LP cooler feed stream 191.

Stream 134 exits HP compressor 132 and is split into stream 289 and bypass stream 138, controlled by bypass valve 140. Bypass valve 140 is controlled by second temperature sensor 276, which measures the temperature of the crude exiting third exchanger 290 in stream 292. Stream 224 is introduced to third heat exchanger 290, which heats crude oil being sent to desalting vessel 234. Stream 291 exits third heat exchanger 290, and is mixed with stream 141 to form HP cooler feed stream 146.

Stream 220 exits crude charge pump 218 and enters second heat exchanger 222, where the crude is heated from the discharge gas of LP compressor 178 in stream 221. Stream 224 exits second heat exchanger 222 and the temperature of stream 224 is measured by first temperature sensor 245. Stream 224 is introduced to third heat exchanger 290, where it is heated by the discharge gas from HP compressor 132 in stream 289. Stream 292 exits third heat exchanger 290, and the temperature of stream 292 is measured by second temperature sensor 276. Wash water stream 226 (fresh and/or recycle) is introduced to stream 292 forming mixed stream 228, which is mixed in mixing valve 230. Desalting vessel feed stream 232 exits mixing valve 230 and is introduced to desalting vessel 234.

Stream 238 exits desalting vessel 234 and is introduced to first heat exchanger 194. Heated dry crude stream 280 exits first heat exchanger 194 and enters control valve 282, which controls flow to dry crude storage tank 286. Dry crude storage feed stream 284 exits control valve 282 and is introduced to dry crude storage tank 286. Dry crude storage tank 286 has an operating pressure at approximately atmospheric pressure. Dry crude storage tank 286 generates a gaseous stream 294, which is introduced to stream 202, generating combined gas stream 206. Stream 288 exits dry crude storage tank 286 and is introduced to crude shipping pump 254. Export crude stream 258 exits crude shipping pump 254. In embodiments of the present disclosure, heat exchangers and after coolers can be controlled to increase or decrease the temperature of liquid or gas fluid streams between about 1° F. and about 200° F., as desired, or between about 10° F. and about 100° F.

Typically, wash water salinity and low TDS stream salinity ranges from about 100 ppm to about 12,000 ppm salt in embodiments of the present disclosure. Wash water will be more effective at lower salinity. Formation water salinity inside crude oil can reach as high as 270,000 ppm of salt content. Demulsifiers, or emulsion breakers, are chemicals used to separate emulsions (for example oil-in-water emulsions). Some commercially available demulsifiers are Petrolite DMO-22241 by Baker Petrolite, Emulsotron CC-8948 by Champion Technologies, SUGEST 9005 by German Metal Surface Treatment Chemical Co., Clariant Phasetreat 4688 by Clariant, or any other suitable demulsifier.

The plurality of fully-insulated electrostatic electrodes can simultaneously dehydrate crude oil and remove emulsified water, for example up to 98% of emulsified water. Fresh wash water can be used in the desalting processes to ensure that the maximum amount of salt is rinsed from the crude oil.

Wet crude oil generally contains some free salty water, and salty water in the form of an emulsion. The emulsion is separated into layers of oil and water by electrostatic coalescence. Electrostatic coalescence applies an electric current, causing water droplets in an emulsion to collide, coalesce into larger (heavier) drops, and settle out of the crude oil as separate liquid water. This process partially dries wet crude oil.

Stabilization is a process carried out using heating to remove any remaining dissolved gases, light, volatile hydrocarbons, and $H_2S$. Crude oil is hence split into two components: atmospheric gas from the overhead, and stabilized, sweetened crude oil from the bottoms, for example at a cold stabilizer product bottom stream. Stabilizing crude oil is achieved when crude oil is heated in a multiple stages of separation drums working at increasing temperatures and reduced pressure.

A cold stabilizer performs two functions simultaneously by sweetening sour crude oil by removing the hydrogen sulfide, and reducing the vapor pressure through removal of light, volatile hydrocarbons, thereby making the crude oil safe for shipment in pipelines. Stabilization involves the removal of light ends from crude oil, mainly $C_1$-$C_4$ hydrocarbons, to reduce the vapor pressure to produce dead or stable product that can be stored in an atmospheric tank. Stabilization aims to lower vapor pressure of crude oil to a maximum RVP of about 7 psia and a maximum TVP of about 13.5 psia at 130° F., or in other words low enough so no vapor will flash under atmospheric conditions, making it safe for transportation and shipment. Operating conditions of a stabilizer, such as for example a cold stabilizer or hot stabilizer, include temperature in a range from about 90° F. or 160° F. to about 200° F. and pressure from about 3 psig to about 5 psig.

In some applications in Saudi Arabia, crude oil grade is measured by the American Petroleum Institute (API) range as follows: Arabian Super Light (49-52 API); Arabian Extra Light (37-41 API); and Arabian Light (32-36 API). API=141.5/(crude oil specific gravity)–131.5.

Wet crude oil as used in the specification generally refers to crude oil having more than about 0.3 volume percent of water, while dry crude oil has less than about 0.3 volume percent of water. The phrase lighter hydrocarbons as used throughout the specification refers generally to $C_{1-4}$ components such as, for example, methane, ethane, propane, butane, iso-butane, and trace amounts of $C_{5+}$ compounds. The phrase heavier hydrocarbons as used in the specification refers generally to $C_{5+}$ or five-carbon and greater hydrocarbons such as, for example, pentane, is-pentane, hexane, and heptane. Heavier hydrocarbons can have trace amounts of lighter hydrocarbons.

Demulsifiers enhance desalting processes and allow treatment of "tight" emulsions. Also referred to as emulsion breakers, demulsifiers are chemicals used to separate emulsions such as, for example, water in oil. For example, one such demulsifier is PHASETREAT® by Clariant of Muttenz, Switzerland.

Although the disclosure has been described with respect to certain features, it should be understood that the features and embodiments of the features can be combined with other features and embodiments of those features. Certain units not shown such as heat exchangers, compressors, valves, off-gas vents, and other will be understood to apply as needed by those of ordinary skill in the art.

Although the disclosure has been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise. The term "about" in some embodiments includes values 5% above or below the value or range of values provided.

As used throughout the disclosure and in the appended claims, the words "comprise," "has," and "include" and all grammatical variations thereof are each intended to have an open, non-limiting meaning that does not exclude additional elements or steps.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

While the disclosure has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present disclosure may suitably comprise, consist or consist essentially of the elements disclosed and may be practiced in the absence of an element not disclosed.

What is claimed is:

1. An integrated gas oil separation method, the method comprising the steps of:
    separating crude oil in a high pressure separator into a high pressure crude oil off-gas and a high pressure partially degassed crude oil output, where the high pressure crude oil off-gas is in a pressure range from about 135 psig to about 500 psig;
    compressing the high pressure crude oil off-gas in a high pressure compressor;
    introducing the high pressure partially degassed crude oil output to a low pressure separator;
    separating the high pressure partially degassed crude oil in the low pressure separator into a low pressure crude oil off-gas and a low pressure partially degassed crude oil output, where the low pressure crude oil off-gas is in a pressure range from about 35 psig to about 180 psig;
    compressing the low pressure crude oil off-gas to produce a compressed low pressure crude oil off-gas;
    separating the low pressure partially degassed crude oil output in an atmospheric separator into an atmospheric crude oil off-gas and an atmospheric partially degassed crude oil output, where the atmospheric crude oil off-gas is in the range of about 3 psig to about 80 psig;
    compressing the atmospheric crude oil off-gas to produce a compressed atmospheric crude oil off-gas;
    injecting the compressed atmospheric crude oil off-gas directly into the crude oil before the low pressure separator;
    desalting the atmospheric partially degassed crude oil output in a desalting vessel generating a desalted partially degassed crude oil output;
    stabilizing the desalted partially degassed crude oil output in a crude stabilizer column to produce a crude oil product and a crude stabilizer column recycle stream comprising crude oil;
    applying the compressed low pressure crude oil off-gas for indirect heating of the crude oil in the crude stabilizer column recycle stream through a first reboiler; and
    applying the high pressure crude oil off-gas for indirect heating of the crude oil in the crude stabilizer column recycle stream through a second reboiler.

2. The method according to claim 1, further comprising the steps of:

cooling the high pressure crude oil off-gas in a high pressure cooler generating a cooled high pressure off-gas; and separating a low total dissolved solids (TDS) water stream from the cooled high pressure off-gas, where the low total dissolved solids water stream salinity ranges from about 100 ppm to about 12,000 ppm salt.

3. The method according to claim 2, further comprising the step of injecting the low TDS water stream into the crude stabilizer column recycle stream as the crude stabilizer column recycle stream is introduced to the first reboiler and the second reboiler.

4. The method according to claim 1, further comprising the steps of:

compressing the compressed low pressure crude oil off-gas in the high pressure compressor generating a compressed high pressure gas stream; and applying the compressed high pressure gas stream for indirect heating of the crude oil in the crude stabilizer column recycle stream through the second reboiler.

5. The method according to claim 1, further comprising the steps of:

cooling the low pressure crude oil off-gas in a low pressure cooler; and separating a water stream from the cooled low pressure off-gas in a low pressure knock-out drum (KOD).

6. The method according to claim 1, wherein the compressed atmospheric crude oil off-gas comprises off-gas from the crude stabilizer column.

7. The method according to claim 1, where the method is operable to refine the crude oil to produce a refined crude oil product for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum Reid vapor pressure (RVP) of about 7 pounds per square inch absolute (psia) and a maximum true vapor pressure (TVP) of about 13.5 psia at 130 degrees Fahrenheit (° F.).

8. The method according to claim 1, further comprising the step of recycling an export gas stream generated from the high pressure compressor and a high pressure discharge KOD is recycled to the crude stabilizer column for use as a stripping gas.

9. The method according to claim 1, wherein an amount of the compressed high pressure gas used in indirect heating in the first reboiler is controlled by a high pressure bypass valve, and further wherein the high pressure bypass valve is controlled by a first temperature sensor located proximate to an outlet of the first reboiler.

10. The method according to claim 1, wherein an amount of the compressed low pressure gas used in indirect heating in the second reboiler is controlled by a low pressure bypass valve, and further wherein the low pressure bypass valve is controlled by a second temperature sensor located proximate to an outlet of the second reboiler.

11. An integrated gas oil separation method, the method comprising the steps of:

separating crude oil in a low pressure separator into a low pressure crude oil off-gas and a low pressure partially degassed crude oil output, where the low pressure crude oil off-gas is in a pressure range from about 35 psig to about 180 psig;

compressing the low pressure crude oil off-gas to produce a compressed low pressure crude oil off-gas;

compressing the compressed low pressure crude oil off-gas to produce a compressed high pressure crude oil off-gas, where the compressed high pressure crude oil off-gas is in a pressure range from about 135 psig to about 500 psig;

separating the low pressure partially degassed crude oil output in an atmospheric separator into an atmospheric crude oil off-gas and an atmospheric partially degassed crude oil output, where the atmospheric crude oil off-gas is in the range of about 3 psig to about 80 psig;

compressing the atmospheric crude oil off-gas to produce a compressed atmospheric crude oil off-gas;

injecting the compressed atmospheric crude oil off-gas directly into the crude oil before the low pressure separator;

desalting the atmospheric partially degassed crude oil output in a desalting vessel generating a desalted partially degassed crude oil output;

separating off-gas from the desalted partially degassed crude oil output in a crude storage tank to produce a crude oil product;

applying the compressed low pressure crude oil off-gas for indirect heating of the crude oil before introduction into the desalting vessel through a first heat exchanger; and applying the compressed high pressure crude oil off-gas for indirect heating of the crude oil before introduction into the desalting vessel through a second heat exchanger.

12. The method according to claim 11, further comprising the steps of:

cooling the high pressure crude oil off-gas in a high pressure cooler generating a cooled high pressure off-gas; and separating a low total dissolved solids (TDS) water stream from the cooled high pressure off-gas, where the low total dissolved solids (TDS) water stream ranges from about 100 ppm to about 12,000 ppm.

13. The method according to claim 11, further comprising the steps of:

cooling the compressed low pressure crude oil off-gas in a low pressure cooler generating a cooled low pressure off-gas; and separating a water stream from the cooled low pressure off-gas in a low pressure knockout drum (KOD).

14. The method according to claim 13, further comprising the step of compressing the cooled low pressure off-gas in a high pressure compressor.

15. The method according to claim 11, wherein the compressed atmospheric crude oil off-gas comprises off-gas from the crude storage tank.

16. The method according to claim 11, where the method is operable to refine the crude oil to produce a refined crude oil product for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum Reid vapor pressure (RVP) of about 7 pounds per square inch absolute (psia) and a maximum true vapor pressure (TVP) of about 13.5 psia at 130 degrees Fahrenheit (° F.).

17. The method according to claim 11, wherein an amount of the compressed high pressure gas used in indirect heating in the first heat exchanger is controlled by a high pressure bypass valve, and further wherein the high pressure bypass valve is controlled by a first temperature sensor located proximate to the crude oil before introduction to the desalting vessel.

18. The method according to claim 11, wherein an amount of the compressed low pressure gas used in indirect heating in the second heat exchanger is controlled by a low pressure bypass valve, and further wherein the low pressure bypass valve is controlled by a second temperature sensor located proximate to the crude oil before introduction to the desalting vessel.

* * * * *